(12) United States Patent
Parish, Sr.

(10) Patent No.: US 11,671,527 B2
(45) Date of Patent: Jun. 6, 2023

(54) ARTICULATED GRIP FOR MOBILE HANDHELD DEVICE

(71) Applicant: David Warren Parish, Sr., Littleton, CO (US)

(72) Inventor: David Warren Parish, Sr., Littleton, CO (US)

(*) Notice: Subject to any disclaimer, the term of this patent is extended or adjusted under 35 U.S.C. 154(b) by 0 days.

(21) Appl. No.: 17/403,991

(22) Filed: Aug. 17, 2021

(65) Prior Publication Data

US 2022/0159113 A1    May 19, 2022

Related U.S. Application Data

(60) Provisional application No. 63/114,462, filed on Nov. 16, 2020.

(51) Int. Cl.
*H04M 1/02* (2006.01)
(52) U.S. Cl.
CPC .................. *H04M 1/0279* (2013.01)
(58) Field of Classification Search
CPC ...... A45F 2200/0516; A45F 5/00; A45F 5/10; A45F 2005/008; A45F 2200/0525; A45F 5/02; A45F 2005/108; A45F 2200/0508; A45F 2005/1013; A45F 2005/1006; A45F 2200/0533; A45F 2005/002; A45F 2005/006; A45F 3/02; A45F 3/14; A45F 5/021; H04M 1/04; H04M 1/0279; H04M 1/0281; H04M 1/725; H04M 1/185; H04M 1/0225; H04M 1/026; H04M 1/23; H04M 1/0212; H04M 1/022; H04M 1/0283; H04M 1/05; H04M 1/21; H04M 1/6041; H04M 1/0202; H04M 1/0214; H04M 1/0235; H04M 1/0247; H04M 1/18; H04B 2001/3861; H04B 1/385; H04B 1/3888; H04B 1/3877; H04B 1/3883; H04B 2001/3866
See application file for complete search history.

(56) References Cited

U.S. PATENT DOCUMENTS 8,186,642 B2    5/2012   Weiss-Vons
8,560,031 B2   10/2013   Barnett et al.
9,787,348 B2   10/2017   Srour
(Continued)

FOREIGN PATENT DOCUMENTS

| WO | WO-2013050065 A1 * | 4/2013 | ............... A45F 5/00 |
| WO | WO2013050065 A1 | 4/2013 | |
| WO | WO2019094152 A1 | 5/2019 | |

OTHER PUBLICATIONS

Written Opinion of the International Searching Authority for International application No. PCT/US 2021/058714.
(Continued)

*Primary Examiner* — Golam Sorowar
(74) *Attorney, Agent, or Firm* — Edlavitch Law PLLC

(57) ABSTRACT

Described herein are improved grips for handheld devices (such as handheld mobile phones). Specifically, the grips disclosed herein overcome many of the technical problems (such as ergonomic problems) found in known grips for handheld devices. Embodiments can include an articulate grip that includes a finger retainer, a phone mount base, and a pivot link connecting the finger retainer and the phone mount base.

20 Claims, 11 Drawing Sheets

(56) References Cited

U.S. PATENT DOCUMENTS

| | | | | |
|---|---|---|---|---|
| 2016/0069512 A1* | 3/2016 | Grieve | .................... | A45F 5/00 |
| | | | | 294/142 |
| 2019/0089822 A1 | 3/2019 | Gartz et al. | | |
| 2019/0098968 A1* | 4/2019 | Quintero | .............. | A44C 25/001 |
| 2019/0140682 A1* | 5/2019 | Barnett | ................ | A44B 99/005 |
| 2019/0178438 A1* | 6/2019 | Liang | .................... | F16M 11/04 |
| 2019/0186680 A1 | 6/2019 | Hobbs et al. | | |
| 2019/0215387 A1 | 7/2019 | Chiang | | |
| 2019/0329397 A1* | 10/2019 | Karmatz | .................. | B25G 1/04 |

OTHER PUBLICATIONS

International Search Report for International application No. PCT/US 2021/058714.
*Quest USA Corp.* v. *PopSockets LLC* (PTAB 2019).
https://www.prnewswire.com/news-releases/popsockets-successfully-defends-its-patent-against-competitor-challenge-300987315.html.

* cited by examiner

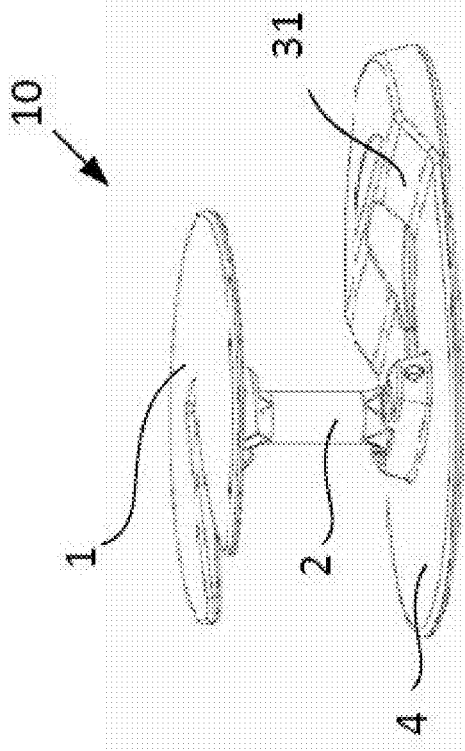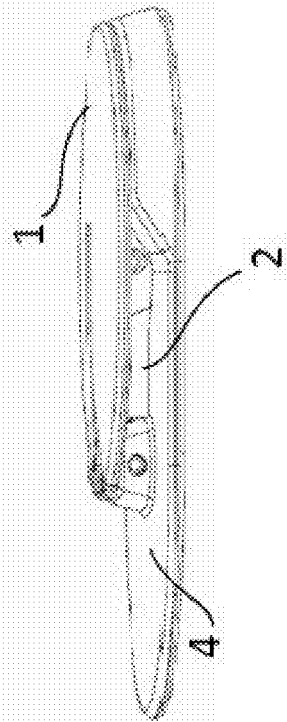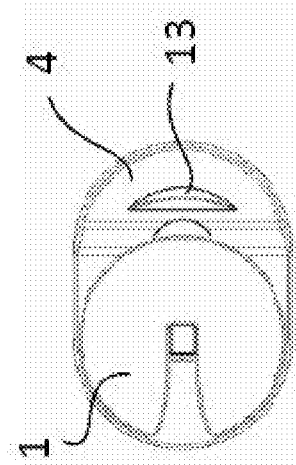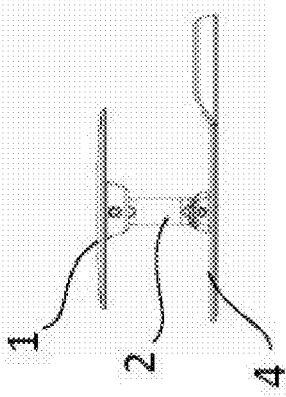
Fig. 4
Fig. 5
Fig. 6
Fig. 7

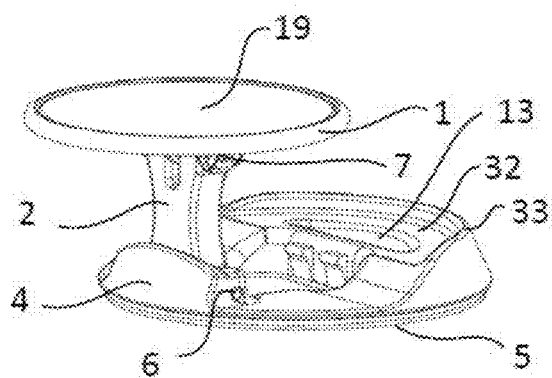
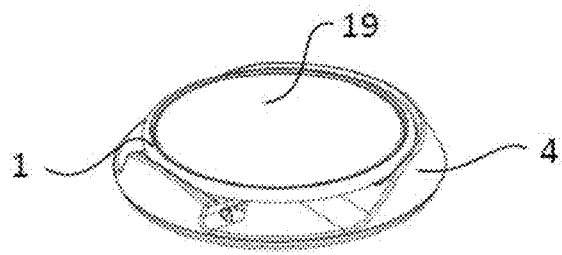
Fig. 16          Fig. 17
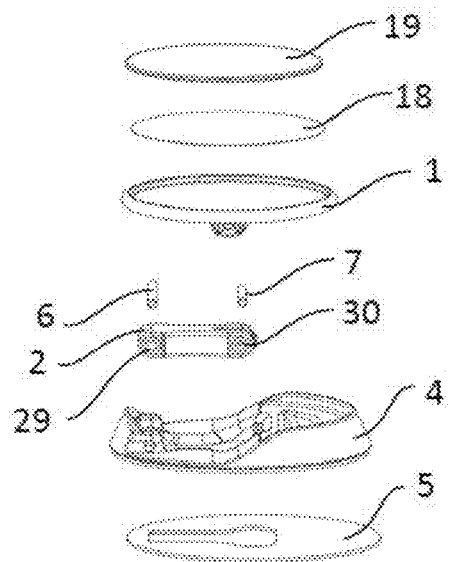
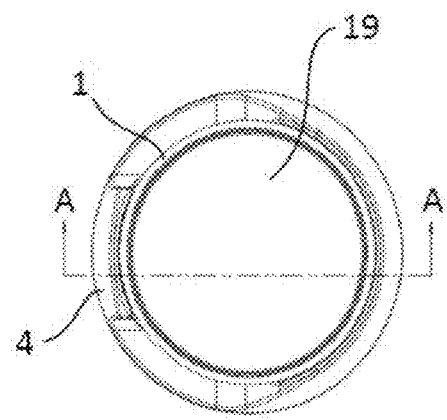
Fig. 18          Fig. 19

SECTION A-A

ARTICULATED GRIP FOR MOBILE HANDHELD DEVICE

CROSS-REFERENCE TO RELATED APPLICATIONS

The present application claims priority to Prov. U.S. Pat. App. Ser. No. 63/114,462, filed Nov. 16, 2020 and entitled "ARTICULATED GRIP", the entire disclosure of which application is hereby incorporated herein by reference.

TECHNICAL FIELD

The present disclosure relates to grip accessories for handheld devices such as handheld mobile electronics and mobile phones.

BACKGROUND

When holding handheld devices such as mobile phones, with or without a protective case, it is advantageous to a user to hold the device with as few as two fingers, such as the index and middle fingers of one hand, allowing support and orientation control of the mobile phone using a generally centrally located grip that engages between or around the user's fingers. Using such a grip thereby allows the user's thumb to control touchscreen contact with the device, rather than being used for grasping. This approach is beneficial to improve the ergonomics of using the touchscreen by increasing the range of locations that can be contacted on the mobile phone's touchscreen with the user's thumb without regrasping. This enhances the ease of use for many mobile phone applications such as photographic image capture initiation and similar pushbutton controls on the device's touchscreen face.

The U.S. Pat. Nos. 8,560,031 and 9,787,348 disclose enhanced grips for handheld devices. Although the grips described in the aforesaid two patents improve gripping of handheld devices, the grips have many technical problems such as ergonomic problems that can be improved upon.

SUMMARY

Described herein are improved grips for handheld devices in that the grips disclosed herein overcome many of the technical problems (such as ergonomic problems) found in known grips for handheld devices.

Also, the systems and apparatus described herein, which include the improved grips for handheld devices, provide many benefits over the known art. For example, an articulated grip described herein can overcome some of the technical problems that may occur in the grips described in U.S. Pat. Nos. 8,560,031 and 9,787,348. For instance, problems with known prior art grips is that such prior art grips lack the low profile compactness and related benefits ergonomic benefits of allowing a minimal finger separation of some of the articulated grips described herein. This is due to the prior art grips' use of cone-like accordion shaped extension members. Prior art grips also lack the ergonomic benefits of an elastomeric compliance of a button top with respect to the base that helps spring load a user's fingers with a comfortable yet secure grasp and feel such as used by some of the articulated grips described herein. Also, prior art grips lack integrated lost and found features and markings that some of the embodiments of the disclosed grips include. Such disclosed grips can have directions for returning a lost item and/or a unique identification number allowing referencing to find an owner of a grip or a device attached to a grip. Also, prior art grips lack the ability to quickly change out a personalized cosmetic top using a simple adhesive attachment approach, that uses a small and simple cosmetic disc or skin and is thereby low in costs and quick to change out with a variety of alternative cosmetic discs for personalization of the grip's cosmetic looks—such as included in some of the embodiments of grips described herein. Further, prior art grips lack special means for mounting a handheld device to a device base or interface of a grip to make the grip highly secure and enabling a device grip with compatible mount that is capable of staying secure in a highly dynamic environment where accelerations may exceed many times the acceleration of gravity and acceleration loads may be present in six axis (X, Y, Z, roll, pitch, yaw)—such as included in some of the embodiments of grips described herein. In summary, at least some of the grips described herein as well as related apparatuses and systems disclosed herein provide beneficial features that are not found in the known prior art.

In some embodiments, an articulated grip provides for an articulated grip accessory for a handheld mobile phone to enhance and to aid a user in holding the mobile phone in the user's hand. Also, it is to be understood that even though examples herein show use of articulated grips with a mobile phone, such grips can be used with any type of mobile or handheld electronic device.

In some embodiments, an articulated grip is reconfigurable from a low profile compact configuration to a high profile extended configuration that allows a user's fingers to fit around a central pivot link (e.g., see pivot link 2) and above a phone mount base (e.g., see phone mount base 3) or recessed phone mount base (e.g., see recessed phone mount base 4) and below a finger retainer (e.g., see finger retainer 1), making the users hold on the phone more secure. It also enables holding and orienting the phone with less effort due to the mechanical constraints of the articulated grip parts constraining excessive degrees of freedom of the phone with respect to the user's hand and retaining the fewer necessary degrees of freedom of the phone (e.g., see handheld mobile phone 8) with respect to the user's hand and fingers (e.g., see hand and fingers 9). It also allows users to quickly change the look of their grip using replaceable art disc tops. It also allows markings that enable providing directions and a unique identifier to enable a lost and found function. It also has features to enable the grip to be snapped into a secure mount for attachment of the phone with grip to a vehicle such as a car dashboard. It also is configured to function as a phone stand so to support the phone on a flat surface at an angle in either portrait or landscape orientation. It also incorporates features to form a hook using the movable links that allow the phone to be hung on various surfaces such as a computer monitor top edge or a lamp shade top edge to hold the phone in a hands-free way and allow the user to use a camera of the device for photos or video applications while hands-free.

Ergonomic grips are beneficial to many users, including especially those with arthritis or those with small hands or weak muscles in their hands, as many mobile phones are getting larger and heavier. And, since many users now use their mobile phones for extended periods of time each day, even average users can benefit from improved grip ergonomics.

Ergonomic grasping of a mobile phone can also benefit from allowing the users fingers to maintain as natural of location as possible and not requiring the user's fingers to split apart at a significant angle when using the articulated grip. Thus, a grip enabling a minimal separation of the user's fingers while holding their mobile phone is a feature of embodiments described herein.

Further ergonomic benefits are gained by making portions of the grip from elastomeric materials that allow the grip shape to flex and stretch slightly to comply with each user's unique finger and hand size and shape to adapt the grip parts to the user body parts, versus having the user required to adapt their fingers or hand grasping posture to the grip. Thus, a grip capable of providing a flexible compliant shape using elastomeric structural materials is a feature of embodiments described herein.

Additionally, users often personalize their phones looks to make it unique to them and to show their personal taste and style and to aid in identification of their phone and avoid confusion or mixing up what phone belongs to them. Thus, a capability of some of the embodiments described herein is to easily modify the cosmetic looks of phones with a grip that also allows modifications of the looks of the grip by changing out a cosmetic "skin" or art-top disc.

Further, users sometimes accidentally lose their mobile phones, and most phones are not obviously marked with their owner's personal identification or contact information to allow a good Samaritan who finds the phone to return it easily, or at all in many cases. Thus, an ability to mark surfaces on the grip to add "if found" return directions and a unique identification number for the user's specific device allowing the finder to contact the mobile phone's owner if the phone is found is a valuable feature included in some embodiments. Placing these return directions and a unique identifier on a visible surface external to the mobile phone and on the grip enables this simple "lost and found" feature and is one the features of some embodiments.

Also, many mobile phone users take their mobile phones with them on the go while driving in cars, riding a bicycle, recreating on a boat, and in many other settings where a phone mount is a useful accessory. Thus, integrating features into the grip to allow a secure mount connection between the grip base that is securely attached to the phone, and also to a vehicle or surface mount that can attach securely to the user's phone and to a vehicle of most any type, such as a car, bicycle, motorcycle, airplane, boat or any of a multitude of similar vehicles is a useful feature found in some embodiments described herein. This is also useful for mounting applications of the phone to a mount attached to a variety of static surfaces as well. Thus, an ability to connect the user's mobile phone with one of the grips disclosed here to a vehicle mount in a highly secure way are features included in some embodiments.

Additionally, an articulated grip that has an extensible button top type finger retainer that can also support a mobile phone at an angle when set on its long side on a flat surface to enabling viewing the phone display screen in landscape orientation or supporting the phone at an angle when it is set on a flat surface in contact with its short side to enable viewing the phones display screen in portrait view orientation is also useful and is another feature in some embodiments.

And, an articulated grip that has an extensible button top type finger retainer that can also become a hanger and support the mobile phone statically by hanging it from the top of a computer monitor for instance to locate and orient the phone's camera for video-conferencing applications, or by hanging it from a horizontal edge or horizontal flat surface that has an adjacent and substantially orthogonal vertical support surface face as well, such as a lamp shade top or a book binding top edge, allows the mobile phones camera to be placed and located and oriented in a stable static fixed location to fix a support for the mobile phone and thereby enable the user to walk away from the phone and take group photographs or videos with the camera stationary allowing the owner to get in the camera view for picture, selfies, or videos. Thus, a mobile phone hanger feature integrated into the grip is another feature of some embodiments.

These and other important aspects of the invention are described more fully in the detailed description below. The invention is not limited to the particular assemblies, apparatuses, methods and systems described herein or in this Summary section. Other embodiments can be used and changes to the described embodiments can be made without departing from the scope of the claims that follow the detailed description.

BRIEF DESCRIPTION OF THE DRAWINGS

The present disclosure will be understood more fully from the detailed description given below and from the accompanying drawings of various embodiments of the disclosure.

FIG. 4 illustrates a top view of an articulated grip with a recessed phone mount base, shown in a compacted configuration, in accordance with some embodiments of the present disclosure.

FIG. 5 illustrates an isometric view of the articulated grip depicted in FIG. 4, shown in an extended configuration, in accordance with some embodiments of the present disclosure.

FIG. 6 illustrates a side view of the articulated grip depicted in FIG. 4, shown in the extended configuration, in accordance with some embodiments of the present disclosure.

FIG. 7 illustrates an isometric view of the articulated grip depicted in FIG. 4, shown in the compacted configuration, in accordance with some embodiments of the present disclosure.

FIG. 16 illustrates an isometric view of an example embodiment of an articulated grip in an extended configuration, in accordance with some embodiments of the present disclosure.

FIG. 17 illustrates an isometric view of the articulated grip depicted in FIG. 16, in the compact configuration, in accordance with some embodiments of the present disclosure.

FIG. 18 illustrates an isometric exploded view of the articulated grip depicted in FIG. 16, in accordance with some embodiments of the present disclosure.

FIG. 19 illustrates a top view of the articulated grip depicted in FIG. 16 in the compact configuration, showing the section A-A plane location, in accordance with some embodiments of the present disclosure.

DETAILED DESCRIPTION OF EXAMPLE EMBODIMENTS

Details of example embodiments of the invention are described in the following detailed description with reference to the drawings. Although the detailed description provides reference to example embodiments, it is to be understood that the invention disclosed herein is not limited to such example embodiments. But to the contrary, the invention disclosed herein includes numerous alternatives, modifications and equivalents as will become apparent from consideration of the following detailed description and other parts of this disclosure.

Described herein are articulated grips for handheld devices, such as handheld mobile electronics and mobile phones. Also, disclosed are apparatuses and systems of and including the articulated grips.

LIST OF REFERENCE NUMBERS SHOWN IN THE FIGURES

Figure 1:
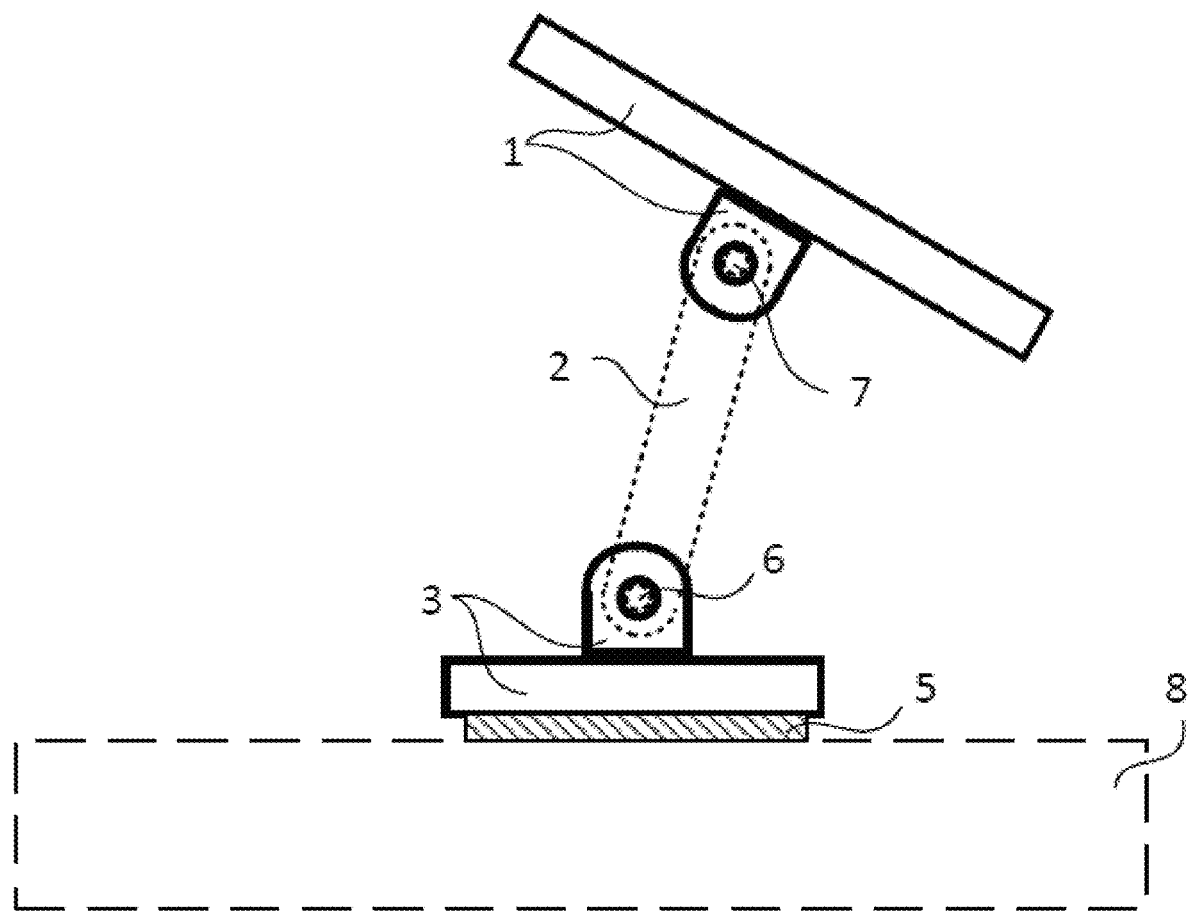
FIG. 1 illustrates a schematic side view of an articulated grip, in accordance with some embodiments of the present disclosure.

1—finger retainer
2—pivot link
3—phone mount base
4—recessed phone mount base
5—two-sided adhesive tape
6—base pivot pin
7—finger retainer pivot pin
8—handheld mobile phone
9—user's hand and fingers
10—articulated grip
11—magnets
12—ferromagnetic sheet with adhesive backing
13—finger retainer recess
14—friction hinge o-rings
15—friction hinge counter-bore 18—double-sided adhesive tape
19—removable art disc top
20—elastomer bump snap protrusion
21—base protrusion for snap retention
22—base bottom undercut
23—base engagement barb
24—annular mount clip with spokes
25—annular mount cover
26—mount fixing double-sided adhesive tape disc
27—clip spokes
28—directions and unique ID markings
29—pivot hole for a base
30—pivot hole for a finger retainer
31—finger bracing chamfer
32—mount base recess
33—mount base protective edge
34—finger retainer mount flanges
35—snap recesses FIG. 1 is a schematic side view of the articulated grip. A handheld mobile phone 8 or its protective case is attached using two-sided adhesive tape 5 to a phone mount base 3. The phone mount base 3 has a revolute hinge joint aligned parallel to the mobile phone's back surface that locates and attaches a pivot link 2 at a common axis and supported by a base pivot pin 6. The pivot link 2 has two parallel revolute hinge joints at opposing distal ends of the pivot link, one of which connects to the phone mount base 3 at the base pivot pin 6 location, and the other of which connects to the finger retainer 1 hinge joint at the finger retainer pivot pin 7 hinge location. This configuration allows the pivot link to lay flat against the phone mount base 3 and in close proximity to the handheld mobile phone 8 back side or attachment surface, in which case the finger retainer 1 is also located in close proximity to the handheld mobile phone 8 back side. The shown configuration in FIG. 1 is the extended configuration for the articulated grip.

Alternatively, the pivot link 2 can be rotated to an orientation such that the pivot links central length axis is orthogonal to the handheld mobile phone 8 back side, thereby moving the finger retainer 1 to an extended location away from the handheld mobile phone 8 back side or attachment surface. The shown configuration in FIG. 2 the extended configuration for the articulated grip.

Figure 2:
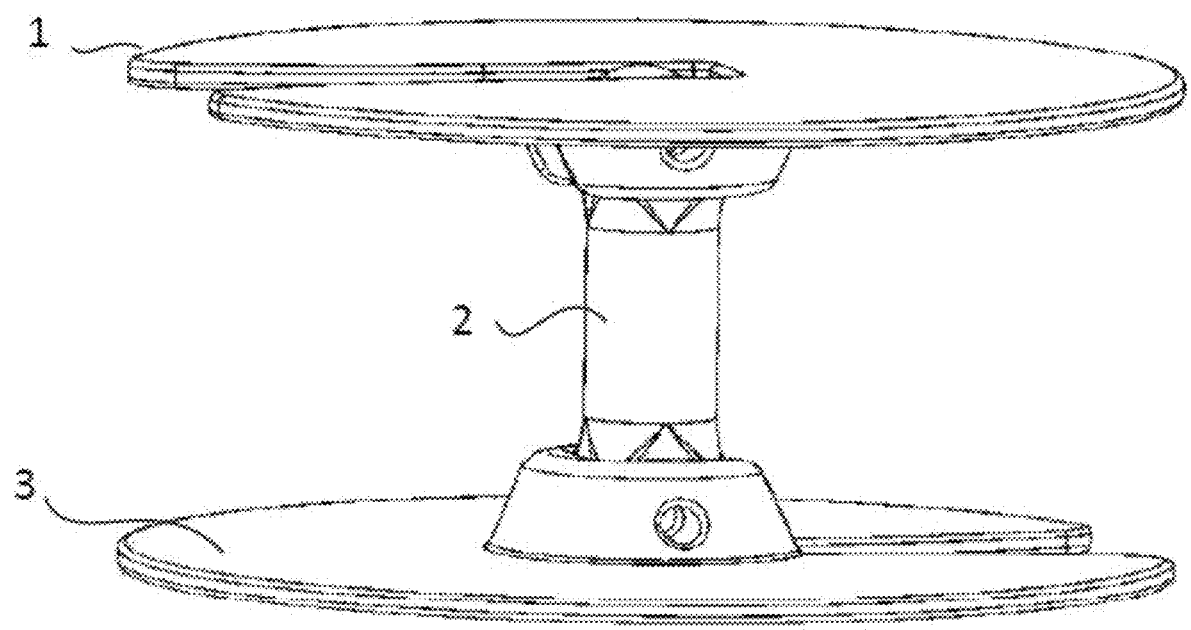
FIG. 2 illustrates an isometric view of an articulated grip, in an extended configuration, in accordance with some embodiments of the present disclosure.
Figure 3:
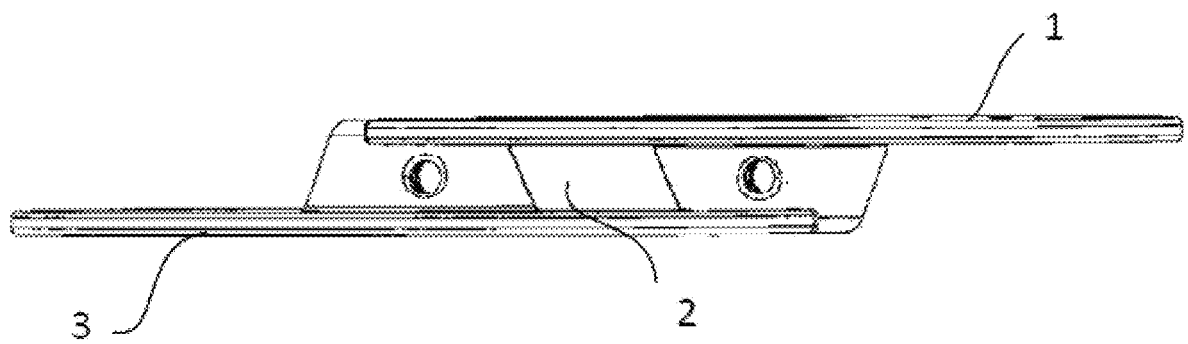
FIG. 3 illustrates a side view of the articulated grip depicted in FIG. 2, in a compacted configuration, in accordance with some embodiments of the present disclosure.

FIG. 2 is an isometric view of a version of the articulated grip, in the extended configuration. FIG. 2. shows an embodiment where the phone mount base 3 and the finger retainer 1 are geometrically similar, and the pivot link connects them at the two revolute hinge joints. FIG. 2 shows the extended configuration for the embodiment. FIG. 3 is a side view of the version of the articulated grip, in the compacted configuration.

FIG. 3. shows the same embodiment as FIG. 2, except the pivot link 2 is rotated to lay flat and parallel to the phone mount base 3 mounting surface, and the finger retainer 1 is also rotated to lay flat and parallel to the phone mount base 3 mounting surface, although the parallel plane orientation is flipped. This is the compact configuration.

One disadvantage of the embodiment shown in FIG. 2 and FIG. 3 is that the finger retainer outer most radial edges are fully exposed and easy to catch or snag on objects the phone may come into contact with. Therefore, a more complex version of an articulated grip is shown in the alternative embodiment as seen in FIG. 4 where the phone mount base 3 is swapped out with a recessed phone mount base 4 that is flush with the outer edges of the finger retainer 1 when as viewed in the top view shown in FIG. 4 with the extended configuration, and as in FIG. 7 when in the compacted configuration.

Figure 8:
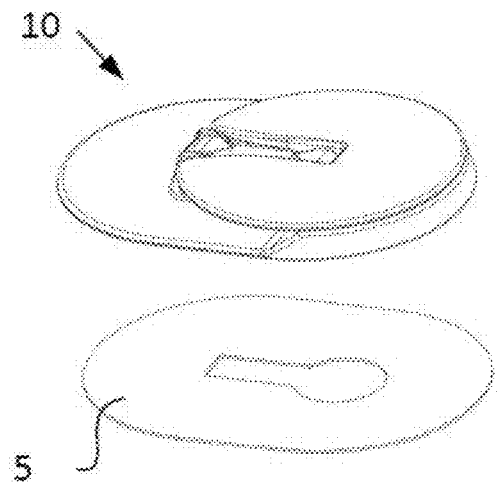
FIG. 8 illustrates an exploded and isometric view of the articulated grip depicted in FIG. 4, shown with a two-sided adhesive tape mounting alternative, in accordance with some embodiments of the present disclosure.
Figure 9:
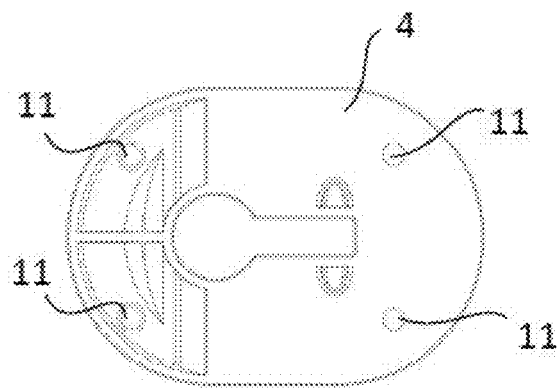
FIG. 9 illustrates a bottom view of the articulated grip depicted in FIG. 4, showing multiple magnets used as part of a magnetic base mounting alternative, in accordance with some embodiments of the present disclosure.

FIG. 4 is a top view of the more complex version of the articulated grip with a recessed phone mount base, shown in the compacted configuration. FIG. 5 is an isometric view of the more complex version of the articulated grip with a recessed phone mount base, shown in the extended configuration. FIG. 6 is a side view of the more complex version of the articulated grip with a recessed phone mount base, shown in the extended configuration. FIG. 7 is an isometric view of the more complex version of the articulated grip with a recessed phone mount base, shown in the compacted configuration. FIG. 8 shows an isometric view of the more complex version of the articulated grip with a recessed phone mount base, shown with the two-sided adhesive tape mounting alternative exploded below. FIG. 9 is a bottom view of the recessed phone mount base—which is a part of the more complex version of the grip—, showing the multiple magnets used as part of the magnetic base mounting alternative.

Figure 10:
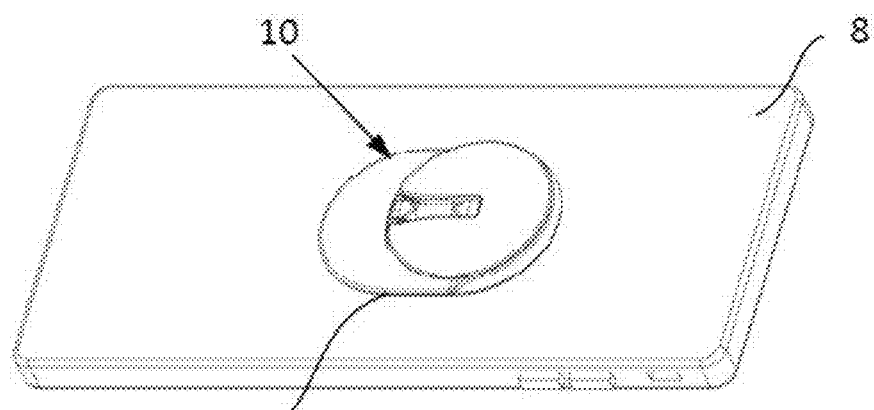
FIG. 10 illustrates an isometric view of the articulated grip depicted in FIG. 4 attached to a handheld mobile phone using the two-sided adhesive tape as an attachment interface to the handheld mobile phone, in accordance with some embodiments of the present disclosure.
Figure 11:
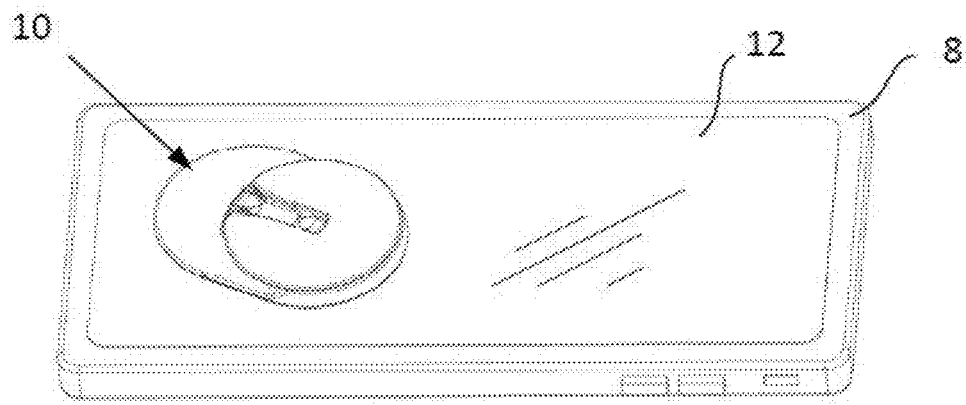
FIG. 11 illustrates an isometric view of the articulated grip depicted in FIG. 4 attached to a handheld mobile phone using the base magnets to attach to a ferromagnetic sheet with adhesive backing, in which the ferromagnetic sheet is an attachment interface to a back side of the handheld mobile phone, in accordance with some embodiments of the present disclosure.

FIG. 10 is an isometric view of the articulated grip attached using the two-sided adhesive tape to a handheld mobile phone. FIG. 11 is an isometric view of the articulated grip attached using the base magnets to the ferromagnetic sheet with adhesive backing, that is thereafter attached to the back of the handheld mobile phone or case.

Figure 12:
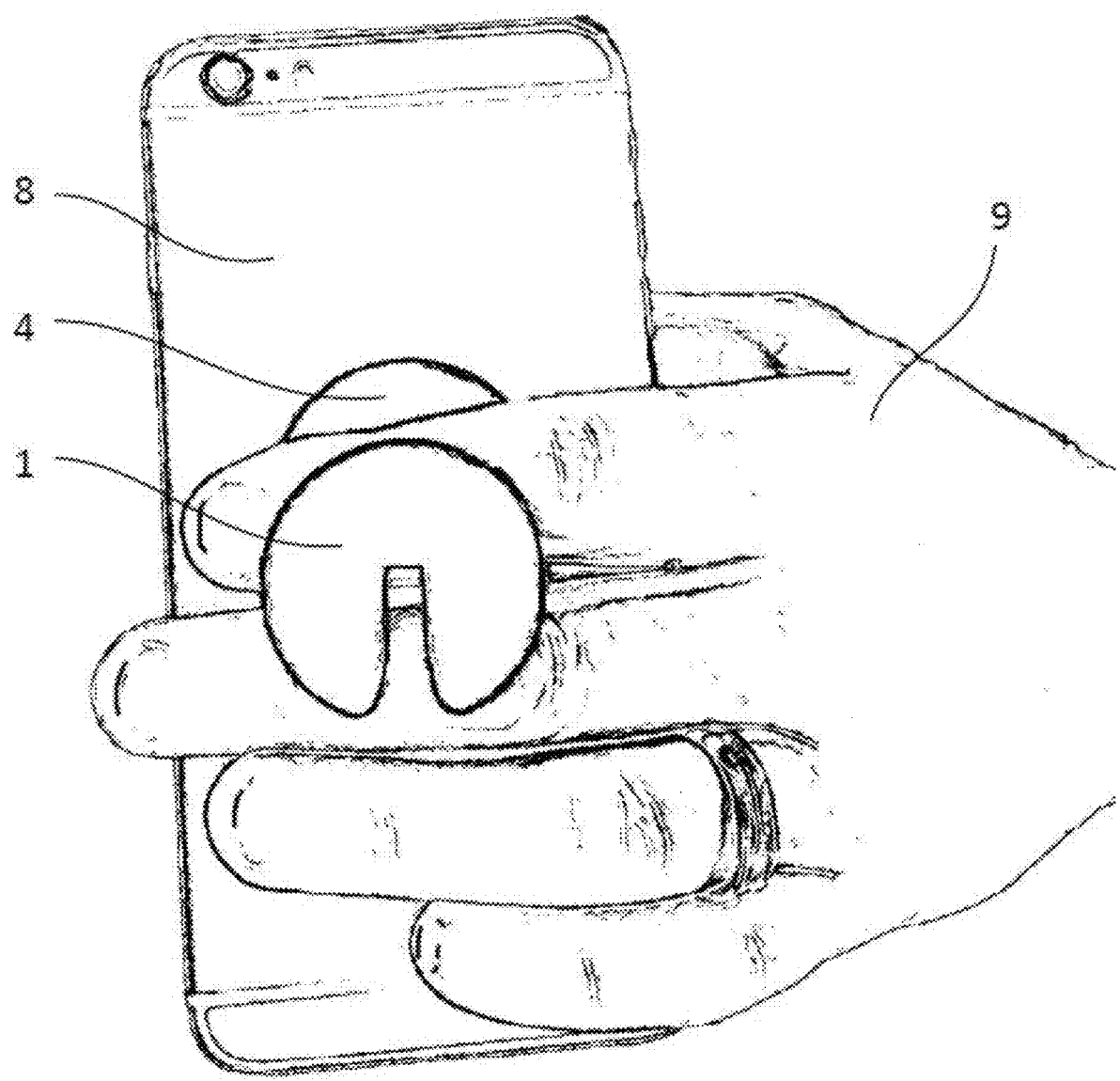
FIG. 12 illustrates a use case with a perspective view of a user's hand with fingers fitting around an articulated grip pivot link and above the recessed phone mount base of the articulated grip depicted in FIG. 4 and below the finger retainer of the grip, in accordance with some embodiments of the present disclosure.

FIG. 12 shows a use case with a perspective view of the user's hand with fingers fit around the articulated grip pivot link and above the recessed phone mount base and below the finger retainer.

Figures 13, 14:
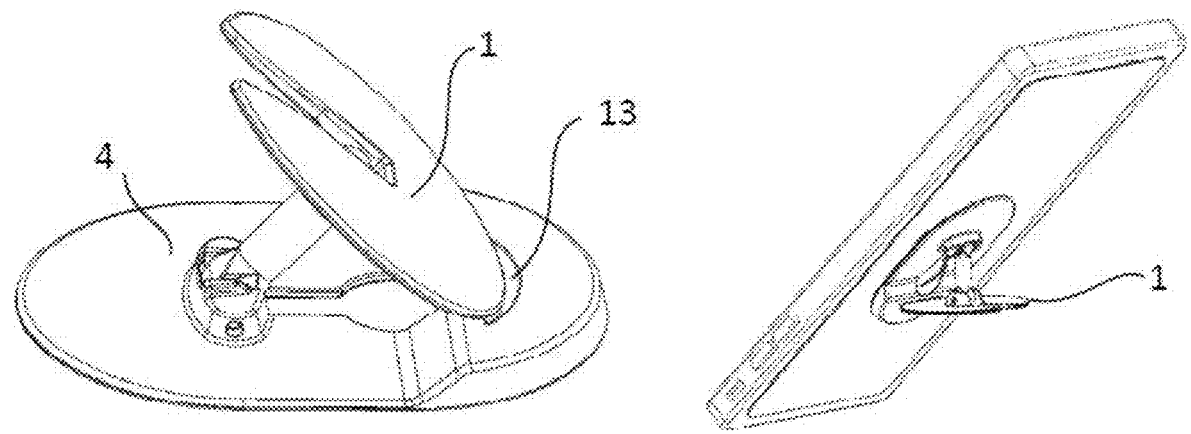
FIG. 13 illustrates an isometric view of a specific configuration of the articulated grip depicted in FIG. 4 with the finger retainer engaged into a finger retainer recess in the recessed phone mount base, in accordance with some embodiments of the present disclosure.
FIG. 14 illustrates an isometric view of the articulated grip depicted in FIG. 4 with the finger retainer engaged into a finger retainer recess in the recessed phone mount base, with the phone attached to a handheld mobile phone and configured to be set on a horizontal surface to support the phone hands-free, in accordance with some embodiments of the present disclosure.
Figure 15:
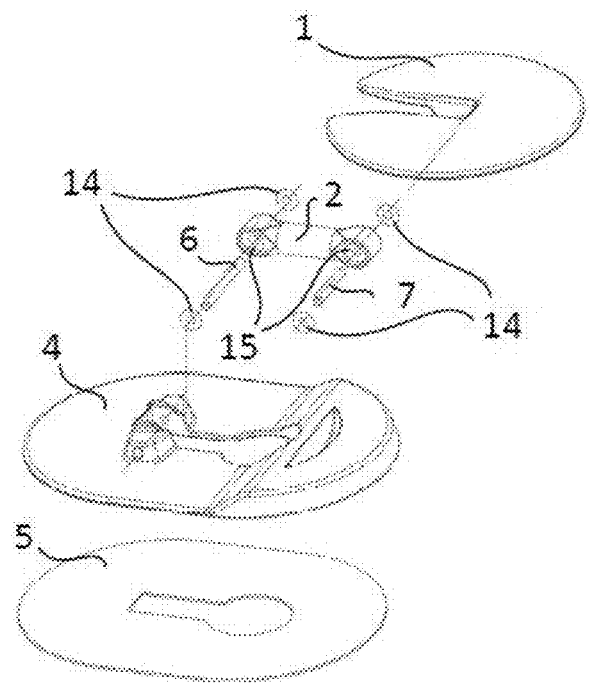
FIG. 15. Shows an isometric exploded view of the articulated grip depicted in FIG. 4 with a friction hinge feature using o-rings installed into recessed counter bores in the pivot link enabling a friction hinge at both ends of the pivot link, in accordance with some embodiments of the present disclosure.

FIG. 13 shows a specific configuration of the articulated grip with the finger retainer engaged into a finger retainer recess in the recessed phone mount base. FIG. 14 shows the articulated grip with the finger retainer engaged into a finger retainer recess in the recessed phone mount base, with the phone attached and ready to be set on a flat horizontal surface to support the phone hands-free. FIG. 15. Shows an exploded view of the articulated grip with the friction hinge feature using o-rings 14 installed into friction hinge counterbores 15 (which can be recessed) in the pivot link 2 enabling a friction hinge at both ends of the pivot link.

As can be seen in FIG. 5 showing an isometric view of the articulated grip in the extended configuration, and in FIG. 6 showing a side view of the articulated grip and also in the extended configuration, a clearance area allowing a user's fingers (index and middle fingers typically) can be placed around either side of the pivot link 2 and the finger retainer 1 will constrain the recessed phone mount base 4 to be in close proximity to the other side of the user's fingers (usually the palm side). This is the first translational degree of freedom constraint. The pivot link 2 engaged between the user's fingers also limits the pivot link motion with respect to the user's finger gap and constrains at least one (normal to finger gap) and in some grip cases (depending on pressure and friction) two degrees of translational freedom (also parallel to finger gap) of the mobile phone with respect to the user's hand. Because of the aforementioned structure, the articulated grip can constrain up to three translational degrees of freedom of the handheld mobile phone with respect to the user's hand. This can aid in the user grip and control of the attached handheld mobile phone 8. Further, the finger bracing chamfer 31 shown in the recessed phone mount base 4 between the top surface plane closest to the mobile phone, and the top surface closest to the finger retainer 1 can provide a smooth ledge that the user's index finger can rests on, aiding in constraining the rotational degree of freedom of the recessed phone mount base 4 and the attached handheld mobile phone 8 as well, about the pivot link central axis along its length based on the user's index finger contact constraint.

When a user's fingers fit around the pivot link, and between the finger retainer and recessed phone mount base, there is a natural tendency for the user to slightly curve their fingers and grip the mobile phone using their finger grip muscles, up to the point that the phone with articulated grip is secure in the user's grasp. FIG. 12 shows a typical grip of a mobile phone using this articulated grip, helping to visualize the degrees of freedom constraints (X, Y, Z, roll, pitch, yaw) of the mobile phone with respect to the user's hand and fingers 9. The curvature of the user's fingers controllably secures the mobile phone to the user's hand with an additional two degrees of freedom (tilt up/down and left/right of the palm) thereby constraining six degrees of freedom of the mobile phone to be secured to the user's hand position and orientation or pose. This results in a feeling of great security of the mobile phone in the user's grasp, without the use of the user's thumb and with a minimum of finger or hand grasping muscle use. Because the phone can be fully secured to the user's hand without the user's thumb, that frees up the thumb to be used by the user to operate the touchscreen controls displayed on the front side display surface of the user's handheld mobile phone. With such functionality, one handed retention, positioning, orientation and control of the user's handheld mobile phone is enabled and made convenient and secure.

Although many users have a broad range of hand and finger sizes, the above mentioned constraints still apply, since a user with smaller hands and thinner fingers can simply and naturally curve their fingers slightly to make contact with the edges of the phone at each end and the pivot link 2 between their fingers and between the phone contact points, as well as wedge their fingers against the finger bracing chamfer 31 to compensate for the difference in finger diameter.

A user with smaller hands and shorter fingers may have difficulty making contact between the tip of their thumb and the handheld mobile phone 8 touchscreen in all locations on the touchscreen. This setback has been compensated for by providing a magnetic attachment option of the recessed phone mount base 4 to attach it to the back surface of a phone (which is in the opposing direction to the touchscreen side of the phone). Such a feature allows the location of the recessed phone mount base 4 to be user controllable based on a user's phone use requirements or preference, anywhere within the area defined by the size of ferromagnetic sheet with adhesive backing 12 located on the back of the phone, and magnetically retained by magnets 11 attached to the bottom surface of the recessed phone mount base 4, as shown in FIG. 9 and FIG. 11. These magnets can be strong magnets, such as high energy product rare earth magnets, e.g., Neodymium-Boron-Ferrite type, class N42.

One potential inconvenience of using the articulated grip design defined so far by this disclosure, is that the two revolute joints between first the finger retainer 1 and pivot link, and secondly between the pivot link 2 and recessed phone mount base 4 may be so easy to rotate that they move under the influence of gravity and reorient themselves without control guidance by the user when the user is extending or compressing the articulated grip. As shown in FIG. 15 this possibility has been remedied by introducing a friction hinge design to both of these revolute joints, using recessed counter-bores in the pivot link 2 on opposing sides of the pivot link and aligned with each pivot axis, sized to enclose an elastomeric friction hinge o-ring (such as one of o-rings 14) on either side of the pivot link 2 that will be compressed slightly (e.g., 5% to 10% of the o-rings section dimeter, depending on the o-ring compliance spring rate and friction characteristics) by the inner walls of the mating surfaces on the finger retainer 1 and recessed phone mount base 4, as shown in FIG. 15. This friction hinge feature overcomes the possibility of gravity induced extension or compaction of the pivot link and finger retainer with respect to the recessed phone mount base.

FIG. 16 shows an isometric view of an exemplary embodiment of the articulated grip in the extended configuration. FIG. 17 shows an isometric view of the exemplary embodiment of the articulated grip in the compact configuration. FIG. 18 shows an isometric exploded view of the exemplary embodiment of the articulated grip.

Construction of the finger retainer 1, pivot link 2 and recessed phone mount base 4 can be made with many manufacturing processed including CNC mill machining, diecasting, sintered powdered metal. In the exemplary embodiment and some other examples, the finger retainer 1 and recessed phone mount base 4 is made up at least partially of injection molded plastic with high strength engineering resin materials such as ABS or PEEK, or comparable materials.

The exemplary embodiment for the pivot link 2 is at least partially made up of an elastomeric material, such as Thermo-Plastic Urethane (TPU)—e.g., a TPU with a medium hardness of approximately Shore A80—and made using a 3D additive printing process or injection molding process. By making the pivot link 2 slightly flexible and stretchable, the finger retainer 1 can move with respect to the phone mount base 3 or recessed phone mount base 4 providing compliance and improving the fit of the grip to the user's fingers, hands and use case.

An exemplary embodiment of the articulated grip is shown in FIG. 16, FIG. 17 and FIG. 18 as well. The parts shown are symmetrically mounted about a plane normal to the recessed phone mount base flat bottom attachment surface, and through the centerline of symmetry of this part in the vertical plane that is orthogonal to the said flat mounting surface. A two-sided adhesive tape 5 disc is adhesively attached to the phone mount base 3 allowing it to be adhered to the user's mobile phone back side or protective case. The phone mount base 3 has a mounting provision for a pivot link 2 using central recess in the phone mount base and a base pivot pin 6 pressed through two holes that align with the pivot link 2 when it is properly located in the central recess of the recessed phone mount base 4, with those holes acting as a hinge point for the pivot link 2 with respect to the recessed phone mount base 4. In such an example, the pivot link 2 is made from elastomeric material that allows flexibility of the link, and also uses two undersized holes at each distal end of the pivot link to locate the base pivot pin hinge point. These pivot link holes are shown as a pivot hole 29 for a base and pivot hole 30 for a finger retainer in the pivot link 2 shown in FIG. 18. The holes 29 and 30 in the pivot link are sized to allow the pivot pins at either end to be pressed through the pivot link, and the undersized dimension of the diameter of these pivot pin holes in the pivot link 2 allow the elastomeric material of the pivot link 2 to squeeze the pins 6 and 7 to retain them axially in the final assembly, keeping the pivot pins in place.

A friction hinge feature is also incorporated into the exemplary embodiment by making the width of the pivot link 2 slightly wider that the width for its location in the recessed opening in the central area of the recessed phone mount base 4 such that the pivot link ends rub against 4 and introduce a friction load that holds the pivot link in place unless it is forcibly moved from that rotation angle about either of the pivot pins.

As shown in FIG. 16, the recessed phone mount base 4 has a mount base recess 32 (which can include a cylindrical flat bottom) that is sized to clear the diameter of the finger retainer 1 bottom side when in the compact configuration and be a flush contact mating surface when in this compact configuration. The finger retainer 1 is protected from snagging on pocket edges approaching from the right side of the device as shown in the figures when in use, by the protection provided by the surrounding mount base protective edge 33. The mount base protective edge 33 is also incorporated in the area around the recessed phone mount base that is closest in proximity to the base pivot pin area, and the mount base recess 32 is extended to and located above that area. The recess with partially encapsulating protective edge limits snagging of the finger retainer from pocket edges approaching from the left side direction when oriented as shown in the figures.

The pivot link 2 distal end furthest from the base pivot pin location also has alignment and support flange features and a hole for pressing in and through the finger retainer pivot pin 7 and finger retainer mount flanges 34 (e.g., see FIG. 21), that aligns and supports the finger retainer 1 to the top of the pivot link 2, which is mounted at that distal end.

FIG. 17 shows the exemplary embodiment in the compact configuration, showing the recessed phone mount base 4 surrounding and supporting the pivot link 2 using the mount base recess 32 and mount base protective edge 33.

The finger retainer 1 has finger retainer mounting flanges 34 located on its bottom side that align the pivot link 2. And, each flange has a coaxial hole in it to act as a revolute joint support structure for the finger retainer. Such features allow the finger retainer pivot pin 7 to be pressed through them. The width of the pivot link 2 is slightly wider than the width between the outer most flanges of the finger retainer mounting flanges 34 to provide slight friction to the hinge motion and avoid uncontrolled motion due to gravity loading.

As shown in FIG. 18, the finger retainer 1 also has a cylindrical recess in its top surface, allowing the placement and fixation of a removable art disc top 19. This art disc top is removably attached to the finger retainer 1 using a double-sided adhesive tape 18 that holds the removable art disc top 19 in the recess of the finger retainer 1 and also allows the removable art disc to be changed by a user by prying out the removable art disc and disengaging the adhesive bond provided by the tape 18 and replacing the removable art disc with an alternative one. The finger retainer 1 can also be constructed with through holes within this clearance area to allow a user to press the removable art disc top 19 out with a sharp instrument such as a pencil tip instead of having to pry out the removable art disc top.

FIG. 19 shows a top view of the exemplary embodiment of the articulated grip in the compact configuration, illustrating the Section A-A plane location. FIG. 19 show a top view of the exemplary embodiment in the compact configuration, showing the location of a section A-A plan for additional Figure views reference and clarity.

Figure 20:
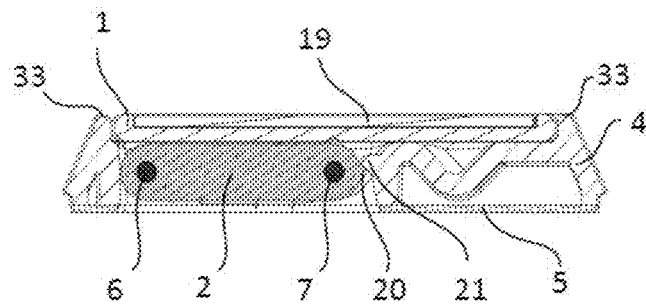
FIG. 20 illustrates the side section A-A view of the articulated grip depicted in FIG. 16, in the compact configuration, in accordance with some embodiments of the present disclosure.

FIG. 20 shows a side section A-A view of the exemplary embodiment of the articulated grip in the compact configuration. FIG. 20 shows a section A-A view of the exemplary embodiment in the compact configuration, with the section plane location shown in FIG. 19.

Figure 25:
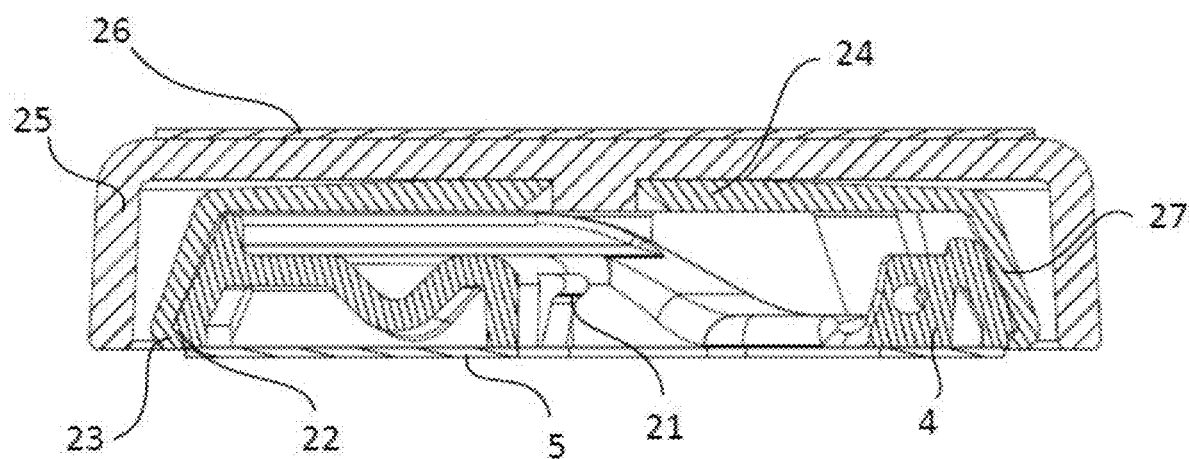
FIG. 25 illustrates a side sectional view in a section aligned with an axially symmetric mount centerline, showing a fit of the phone mount base depicted in FIG. 24 with the mobile phone mount, and illustrating engagement of the base engagement barbs into the base bottom undercut, in accordance with some embodiments of the present disclosure.

FIG. 20 shows the fit of the removable art disc top 19 into the cylindrical recess of the finger retainer 1. It also illustrates the fit of the finger retainer 1 located against the mount base recess 32 and axially aligned within the mount base protective edge 33, which can occur when in the compact configuration. Also shown is an elastomer bump snap protrusion 20 molded into the end of the pivot link 2 near the center of the articulated grip. The bump snap protrusion 20 can deform to fixably engage a holding snap feature as the finger retainer is rotated about the pivot links and pressed into the compact configuration. With such a feature, the elastomer bump snap protrusion contacts, deforms, and then passes by a rounded base protrusion for snap retention 21 feature molded into the recessed phone mount base 4. The base protrusion for snap retention 21 is shown in FIG. 25. The elastomer bump snap protrusion 20 and base protrusion for snap retention 21 incorporated into the pivot link 2 and the recessed phone mount base 4 allow the finger retainer to be pressed into the compact configuration and snapped into place to retain the finger retainer in the compact configuration.

Figure 21:
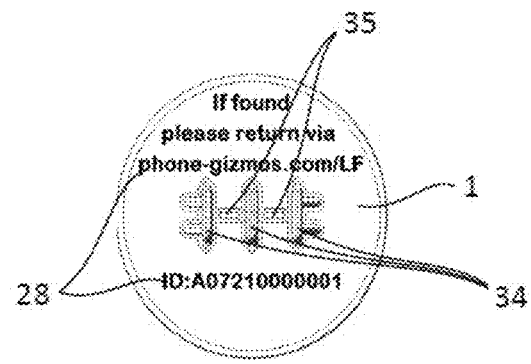
FIG. 21 illustrates a bottom view of a bottom surface of a finger retainer of an articulated grip that has readable markings including reference directions for returning the item to an owner and a unique Identification string (ID) to uniquely specify the grip and a possible handheld device and owner of the grip and device, in accordance with some embodiments of the present disclosure.

FIG. 21 shows the bottom surface of the finger retainer 1 that has readable markings including reference directions for returning the item to an owner and a unique Identification string (ID) to uniquely specify this specific device and owner.

FIG. 21 shows the bottom side of the finger retainer 1 illustrating an embodiment for the location and construction of the finger retainer mount flanges 34. It also shows an embodiment of snap recesses 35 that also engagement with the elastomer bump snap protrusion 20 molded into the pivot link 2, allowing the finger retainer 1 to be stable when the pivot link is oriented normal to the phone back mounting surface, and the finger retainer is parallel to the phone back mounting surface.

FIG. 21 also shows alpha-numeric strings containing directions and unique ID markings 28 that can be marked on the back of the finger retainer 1 to provide information to a person who finds another person's mobile phone, with directions on how to return that phone to the owner. These directions can use a reference to a web site, where a person can visit and use the unique ID to reference a database to obtain the contact information for the owner and user specific guidance on how to contact or return the phone. Such a web site supplying return information referencing capability can always be available or only available if the owner realizes the device is lost and also goes to the web site and logs on to an associated account and enables the disbursement of their contact information. The directions to the web site and/or the unique ID markings can be alpha-numeric text containing the directions and unique ID, or a visual camera based automatic reference technique using modern mobile phone cameras and standard contemporary mobile phone software and/or applications to access and use a quick reference (QR) type two dimensional code image that can encode the web site and unique ID in an easier to use way.

Figure 22:
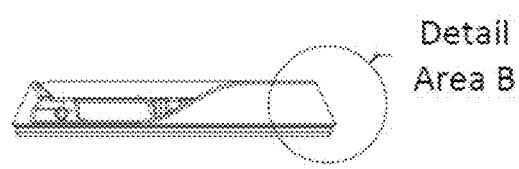
FIG. 22 illustrates a side view of the articulated grip depicted in FIG. 16, in the compact configuration, showing a detail area B on the grip, in accordance with some embodiments of the present disclosure.
Figure 23:
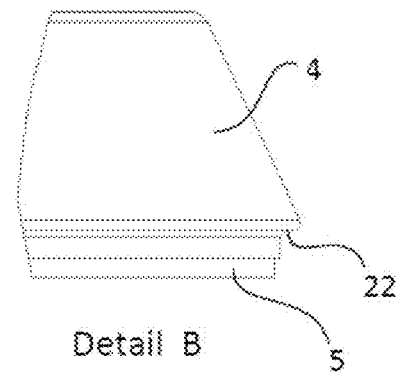
FIG. 23 illustrates the detail area B of the grip showing a base mount undercut allowing attachment of a phone mount to the phone mount base, in accordance with some embodiments of the present disclosure.

FIG. 22 shows a side view of the exemplary embodiment of the articulated grip in the compact configuration, illustrating an area B on the grip. FIG. 23 shows the area B of the grip illustrating the base bottom undercut 22 allowing attachment of a phone mount to the exemplary embodiment phone mount base. Also, FIG. 22 shows a side view of the exemplary embodiment illustrating the area B for reference in the FIG. 23.

FIG. 23 shows a detail of one area of the recessed phone mount base exemplary embodiment, illustrating the base bottom undercut 22 molded into the recessed phone mount base 4 adjacent to or near its bottom surface that mounts to the user's mobile phone back using the two-sided adhesive tape 5 disc with cutout. The base bottom undercut 22 allows a plurality of mounting options to engage with the recessed phone mount base 4, including an annular mount clip with spokes and barbs at the ends to snap in under the base bottom undercut 22, or a thin flat metal mount with a contoured slot that fits below and around the contours and flat surface of the base bottom undercut 22 and also against the mobile phone back or protective case.

Figure 24:
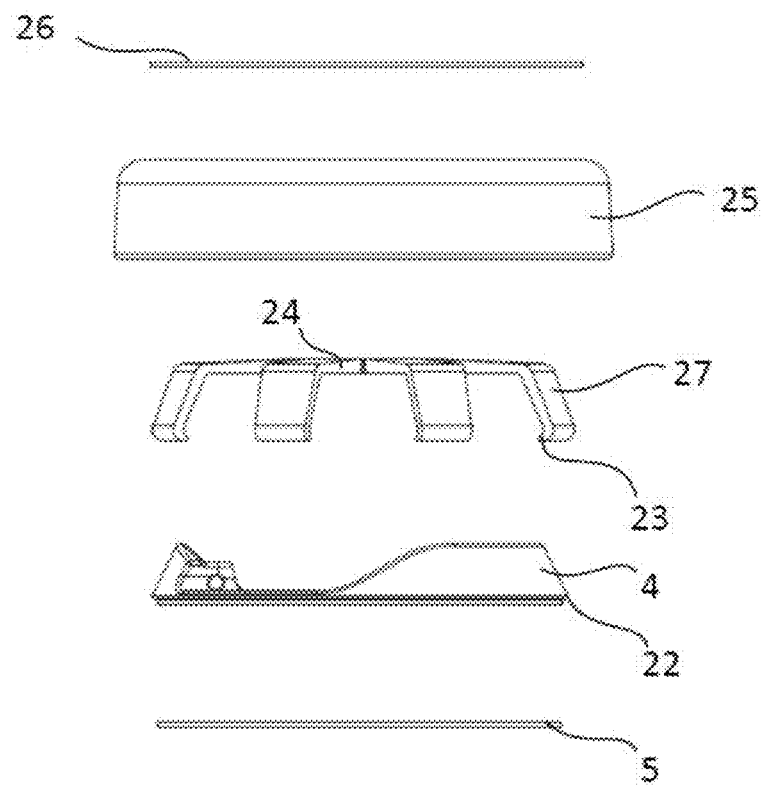
FIG. 24. illustrates a side perspective exploded view of an embodiment of a mobile phone mount that is compatible with some embodiments of the articulated grip (such as the grip shown in FIGS. 4 and 16, showing an annular mount clip with spokes with a plurality of clip spokes that locate a plurality of base engagement barbs annularly around a phone mount base of some of the embodiments described herein (such as the embodiments shown in FIGS. 4 and 16) and snap into a reduced radial section of a base bottom undercut to removably affix the grip to the phone mount, in accordance with some embodiments of the present disclosure.

FIG. 24. shows a side exploded view of an embodiment of a mobile phone mount that is compatible with the exemplary embodiment of the articulated grip, illustrating an annular mount clip with spokes 24 with clip spokes 27 that locate a plurality of base engagement barbs 23 annularly around the phone mount base 3 and snap into the reduced radial section of the base bottom undercut 22 to removably affix the grip to the phone mount and any surface it is attached to.

FIG. 25 shows a side view in section aligned with the axially symmetric mount centerline, illustrating the fit of the exemplary embodiment of the phone mount base 3 with the mobile phone mount, and illustrating the engagement of the base engagement barbs 23 into the base bottom undercut 22.

FIG. 24 further illustrates a side exploded view of the exemplary embodiment for the mount and a clip-in mount compatible with the exemplary embodiment of the grip. And, shown at the bottom is the two-sided adhesive tape 5 disc that adhesively mounts the recessed phone mount base 4 to the back of a user's handheld mobile phone 8 or case of the phone. The recessed phone mount base and the base bottom undercut 22 provides an annular disc with a radiused transition into the taper of the recessed phone mount base 4 surfaces that allows engagement with the annular mount clip with spokes 24 near the end of each of the clip spokes 27 using a base engagement barb 23 feature at the end of the spoke. The base engagement barb is sized and shaped to wrap around and contact the base bottom undercut when the phone and grip is pressed on to the mount in an axial symmetric orientation. The clip spokes 27 use a tapered thickness section designed to flex as a cantilever beam in its first mode of bending to allow each spoke's end, including the base engagement barb 23, to flex radially outward as the annular mount clip with spokes 24 is pressed over the tapered outer radial surface of the recessed phone mount base 4; and as a result, causing the base engagement barb 23 features to snap over and around the base bottom undercut 22 (which can be annular) and the adjacent radius surfaces to secure the phone mount to the mount assembly—such as shown in FIG. 25 and as shown in FIG. 24. FIG. 25 further depicts the main mount related relevant parts only and the recessed phone mount base 4 without the pivot link 2 or finger retainer 1. In some embodiments, as shown, the tip of the base engagement barb is tapered down toward the mobile phone side at approximately a 30 to 60 degree angle from horizontal, so that when a user pulls up on the mobile phone with an exemplary embodiment extensible grip, the base engagement barbs have some component of force in the outward radial direction thereby causing them to flex outward increasing the effective diameter of the base engagement barb 23 (which can be annular) such that the mobile phone and securely attached recessed phone mount base can pull out of the mount. This design allows the mobile phone to be removably secured at the base of the grip, near the mobile phone device, making the phone capable of being snapped in or out of the mount by pulling on the phone, in a direction normal to the display face of the mobile phone. This technique allows the mount to secure the grip and mobile phone attached thereto in a secure way, constraining five degrees of freedom firmly (X, Y, Z, roll, pitch) and the sixth degree of yaw freedom firmly but rotationally twistable for orientation control by the user if desired by overcoming the yaw axis friction constraint between 22 and 23 that retards inadvertent yaw rotation about the axial symmetric centerline axis of the mount and normal to the phone back face.

The annular mount clip with spokes 24 is aligned coaxially and ultrasonic welded or fastened to the annular mount cover 25 that protects the annular mount clip with spokes 24 and provides a cosmetic cover surface. The annular mount cover 25 is then attachable to a smooth flat surface where the mount will be affixed as decided by the user, using the mount fixing double-sided adhesive tape disc 26. The annular mount cover 25 and the mount fixing double-sided adhesive tape disc 26 can be replaced with alternative embodiments to allow other attachment means such as for instance a flexible ball mount or other suitable mount attachment means for affixing the mount to the user's vehicle attachment surface.

As shown in FIG. 25, the annular mount clip with spokes can be secured to the annular mount cover 25. The securing of the aforesaid parts can be done through an ultrasonic welding procedure along the centerline of the assembly. FIG. 25 also illustrates a view of the base protrusion for snap retention 21 formed into the recessed phone mount base 4, shown on one side of the skewed section view.

In the embodiment that uses the recessed phone mount base 4, the user can install the articulated grip on the handheld mobile phone 8, and the user has multiple options. For example, a first option for installing the articulated grip on the mobile phone 8 is to use the two-sided adhesive tape 5 to adhesively attach the bottom surface of the recessed phone mount base to the back surface of the handheld mobile phone 8 or a case that will surround and protect this handheld mobile phone 8. FIG. 8 shows two-sided adhesive tape 5 (which can be the die-cut) exploded below an articulated grip 10. FIG. 16 shows a comparable illustration for the exemplary embodiment. One side of the two-sided adhesive tape is placed against the bottom surface of the recessed phone mount base 4, and the other side of the two-sided adhesive tape 5 is exposed then secured to the back side of the handheld mobile phone 8 or its case, in a location selected by the user (e.g., centered by the user on the back of the phone or case). This mounting approach has the advantage of being more secure for the mounting of the articulated grip to the handheld mobile phone 8. For example, a second option for installing the articulated grip on the mobile phone 8, but not incorporated in the exemplary embodiment, is to attach the ferromagnetic sheet with adhesive backing, securing it to the back surface of the handheld mobile phone 8 or its case. The two-sided adhesive tape is not used in this mounting configuration. The bottom surface of the recessed phone mount base 4 has a plurality of small high energy product magnets fixed to the recessed phone mount base, as shown for example in FIG. 9 as magnets 11. The user can then place the bottom surface of the articulated grip against the front ferromagnetic sheet surface, attached to the phone, at a location on the back of the phone that is selected. This mounting approach has the advantage of allowing the placement location of the articulating grip to be varied and easy to change.

When the user wants to extend the articulated grip in order perform a typical grasp for use of their handheld mobile phone with articulated grip, the user can pull outward on the finger retainer 1 away from the recessed phone mount base 4, thereby causing the finger retainer to snap away from the recessed phone mount base 4 in the exemplary embodiment, inducing a rotation of the revolute joints at both ends of the pivot link 2 such that the finger retainer 1 and pivot link 2 become orthogonal, and recessed phone mount base 4 and pivot link 2 become substantially orthogonal. This results in the articulated grip configuration as shown in FIG. 5 or FIG. 16 with the exemplary embodiment. The user then can insert two of their fingers, such as the index finger and middle finger over the recessed phone mount base 4, and under the finger retainer 1 and partially around the pivot link 2. The user can then find a comfortable and secure grip between their hand and fingers 9 and the handheld mobile phone 8 by slightly bending their fingers such that the back side of their fingers away from their palm contacts the finger retainer 1 and their finger-tips contact one side of the back of the mobile phone 8 and the base of their fingers and/or the palm of their hand contacts the opposing side of the handheld mobile phone 8. A grasp and holding configuration for the handheld mobile phone 8 by the user while using the articulated grip device is shown in FIG. 12. This configuration makes the grasping of the phone more secure and holding and orienting the phone can be done with less effort due to the mechanical constraints of the articulated grip constraining excessive degrees of freedom and retaining the fewer necessary degrees of freedom of the handheld mobile phone 8 with respect to the user's hand and fingers 9.

Figure 26:
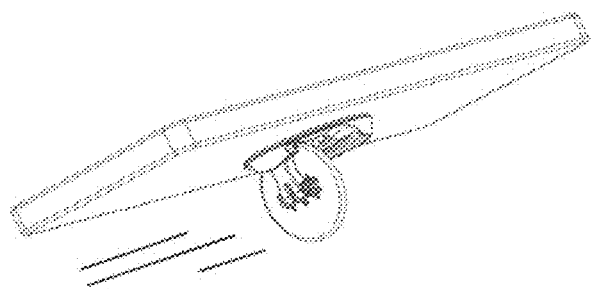
FIG. 26 illustrates the grip depicted in FIG. 4 configured for stand mode supporting a mobile phone at a particular viewing angle while on a flat surface, allowing a user to view the phone's video screen in landscape orientation, in accordance with some embodiments of the present disclosure.
Figure 27:
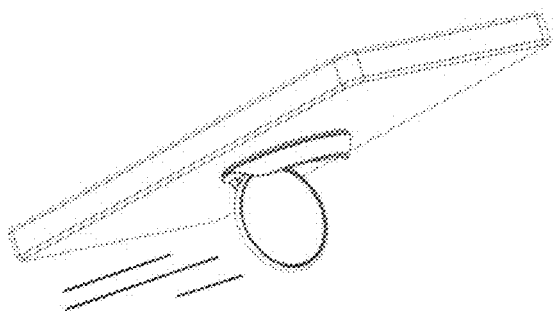
FIG. 27 illustrates the grip depicted in FIG. 4 configured for stand mode supporting the mobile phone at a particular viewing angle while on a flat surface, allowing the user to view the phone's video screen in portrait orientation, in accordance with some embodiments of the present disclosure.
Figure 28:
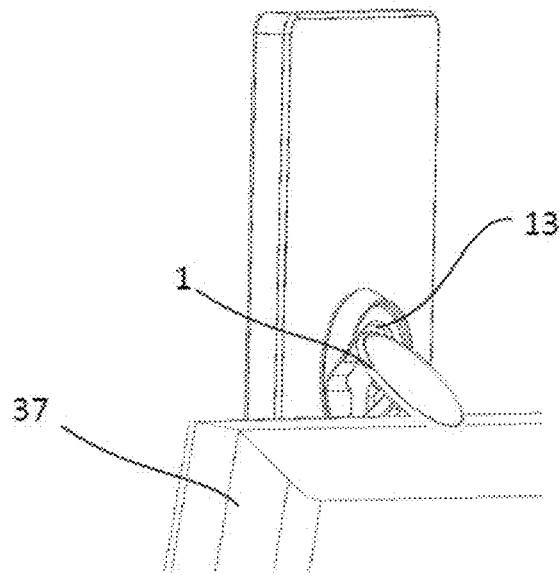
FIG. 28 illustrates the grip depicted in FIG. 4 configured for hanger mode supporting the mobile phone at a particular viewing angle while the finger retainer hooks over a flat edge with a perpendicular front surface, such as a surface of computer monitor, lamp shade or book binding end (which allows the user to fix the phone's location and orientation and use the camera hands-free for photographic or video applications), in accordance with some embodiments of the present disclosure.

FIG. 26 shows the grip configured for stand mode supporting the mobile phone at a particular viewing angle while on a flat surface, allowing the user to view the phone's video screen in landscape orientation. FIG. 27 shows the grip configured for stand mode supporting the mobile phone at a particular viewing angle while on a flat surface, allowing the user to view the phone's video screen in portrait orientation. FIG. 28 shows the grip configured for hanger mode supporting the mobile phone at a particular viewing angle while the finger retainer hooks over a flat edge with a perpendicular front surface, such as a computer monitor, lamp shade or book binding end thus allowing the user to fix the phone's location and orientation and use the camera hands-free for photographic or video applications.

With the articulated grip in the extended position and with the finger retainer 1 parallel to the pivot link 2, the user can also place the handheld mobile phone 8 on its long or short side in order to support it statically on a flat surface such as a table, for the purposes of tilting the display screen toward an opposing viewing location so the user can watch videos or movies on their handheld mobile phone or smartphone device. This can be done in a landscape orientation as illustrated in FIG. 26 or in portrait viewing orientation as illustrated in FIG. 27. Further, if the user wants to use the camera on the handheld mobile phone as a live streaming video source, as is often done with smartphones, the user can place the finger retainer 1 into the finger retainer recess 13 to constrain the pivot link 2 rotation and provide a hanger hook-like feature. The user can then hook the finger retainer 1 over the top edge of a relatively thin flat topped object, such as a computer monitor as illustrated in FIG. 28, or a lamp shade, book binding top end surface or some automobile steering wheels. This provides a stable hanging mode for the mobile phone device and a hands-free way to retain the phone or smartphone in a stable way while they video conference or take selfie pictures of themselves from a distance for instance.

Often, when a handheld device is not in use, a user carries the device in a stored location such as a pants pocket, with the articulated grip kept in the compressed configuration and snapped down in the exemplary embodiment to provide compact stowage. In some embodiments, the compressed configuration is achieved by pushing and rotating the finger retainer 1 toward the recessed phone mount base 4, and as a result, inducing a rotation of the revolute joints at both ends of the pivot link 2 such that the finger retainer 1 and pivot link 2 and recessed phone mount base 4 have a parallel top surface and the configuration as it is shown in FIG. 10. In the exemplary embodiment, this can result in the pivot link 2 elastomer bump snap protrusion 20 deforming and passing past the base protrusion for snap retention 21, and as a result, causing the finger retainer to snap into place and be retained in the compact configuration as it is shown in FIG. 20.

In summary, embodiments of the articulated grip can enhance the ease of gripping, holding and orienting a handheld electronic device, such as a mobile phone, when it is in its extended configuration, and it provides advantages of compact storage when collapsed. It also provides advantages of improved ergonomics, personalized and easily changed cosmetic looks, ability to incorporate markings providing directions and unique identification enabling a lost-and-found return ability, compatibility with a secure mount features, status orientation of the phone tilted at an angle to enhance viewing in landscape or portrait orientations, and a hanger feature that allows hands-free support of the user's device that enables improved video and photographic capture possibilities.

Some embodiments include an apparatus that includes a finger retainer (e.g., see finger retainer 1), a phone mount base (e.g., see phone mount base 3), and a pivot link (e.g., see pivot link 2). In such embodiments, the pivot link includes a first hinge joint part at a first end of the pivot link, configured to connect to a hinge joint part of the finger retainer, and a second hinge joint part at a second end of the pivot link, configured to connect to a hinge joint part of the phone mount base. In such embodiments, the first end of the pivot link opposes the second end of the pivot link. The apparatus also includes a first hinge joint, including, the first hinge joint part of the pivot link and the hinge joint part of the finger retainer, as well as a second hinge joint, including, the second hinge joint part of the pivot link and the hinge joint part of the phone mount base.

In some embodiments, the phone mount base is a recessed phone mount base (e.g., see phone mount base 4).

In some embodiments, the phone mount base includes a first side configured to attach to the second hinge joint part of the pivot link, and the phone mount base also includes a second side, opposing the first side, including an adhesive surface. The adhesive surface is one surface of two-sided adhesive tape (e.g., see two-sided adhesive tape 5).

In some embodiments, the phone mount base is integrated with a protective phone case (not depicted in the drawings).

In some embodiments, the phone mount base includes a first side configured to attach to the second hinge joint part of the pivot link, and the phone mount base also includes a second side, opposing the first side, including a plurality of magnets (e.g., see magnets 11).

In some embodiments, the first hinge joint includes a finger retainer pivot pin (e.g., see finger retainer pivot pin 7), and the first hinge joint part of the pivot link, the hinge joint part of the finger retainer, and the finger retainer pivot pin are combinable along a common axis to form the first hinge joint.

In some embodiments, the second hinge joint includes a base pivot pin (e.g., see base pivot pin 6), and the second hinge joint part of the pivot link, the hinge joint part of the phone mount base, and the base pivot pin are combinable along a common axis to form the second hinge joint.

In some embodiments, the phone mount base includes a finger retainer recess configured to constrain rotation of the pivot link to provide a hook-like feature of the apparatus (e.g., see FIGS. 26 to 28).

In some embodiments, the phone mount base is a recessed phone mount base and includes a chamfer (e.g., see finger bracing chamfer 31). In such embodiments, the phone mount base can include a finger retainer recess configured to constrain rotation of the pivot link to provide a hook-like feature of the apparatus.

In some embodiments, the first hinge includes a first plurality of friction hinge o-rings (e.g., see friction hinge o-rings 14), and the first hinge includes a first friction hinge counter-bore (e.g., see friction hinge counter-bore 15). Also, the second hinge includes a second plurality of friction hinge o-rings, and the second hinge includes a second friction hinge counter-bore. In such embodiments, the pivot link can include an elastomeric material and can be configured to align the finger retainer with the phone mount base and integrate with the first plurality of friction hinge o-rings and the second plurality of friction hinge o-rings.

In some embodiments, the apparatus includes a removable art disc top configured to be attached to the finger retainer (e.g., see removable art disc top 19). The finger retainer includes a first side configured to attach to the first hinge joint part of the pivot link and a second side opposing the first side. Also, the apparatus includes a double-sided adhesive film (e.g., see double-sided adhesive tape 18) configured to attach the removable art disc top to the second side of the finger retainer.

In some embodiments, the phone mount base is a recessed phone mount base (e.g., see recessed phone mount base) and the apparatus includes an elastomer bump snap protrusion (e.g., see elastomer bump snap protrusion 20) molded into the pivot link that deforms to engage a holding snap feature of the apparatus as the finger retainer is moved into a compact configuration (e.g., see base protrusion for snap retention 21).

In some embodiments, the finger retainer includes a first side configured to attach to the first hinge joint part of the pivot link and a second side, opposing the first side, including alpha-numeric strings containing directions and unique ID markings (e.g., see directions and unique ID markings 28).

In some embodiments, the apparatus includes a unique ID marking on a surface of the apparatus, and the unique ID marking includes a two-dimensional barcode (not depicted).

In some embodiments, the phone mount base includes a beveled undercut (e.g., see base bottom undercut 22), configured to support a snap-in attachment. Also, in such embodiments, the phone mount base includes a separate mount that engages the beveled undercut to hold a mobile phone firmly to withstand separation between the apparatus and the separate mount while the mobile phone and apparatus are accelerated in any direction encountered while being within a moving vehicle (e.g., see the parts illustrated in FIGS. 24 and 25).

In some embodiments, the phone mount base includes a first recess to support the finger retainer in a first position that is a first amount of degrees to a back surface of the phone mount base so that the apparatus provides a stand (e.g., see FIGS. 26 and 27). Also, in such embodiments, the phone mount base includes a second recess to support the finger retainer in a second position that is a second amount degrees to the back surface of the phone mount base so that the apparatus provides a hook-like feature (e.g., see finger retainer recess 13 as well as FIG. 28).

In some embodiments, the pivot link includes a first hinge joint part at a first end of the pivot link, and the first hinge joint part of the pivot link is configured to connect to a hinge joint part of the finger retainer. In such embodiments, the first hinge joint part of the pivot link, the hinge joint part of the finger retainer, and a finger retainer pivot pin are combinable along a first common axis to form a first hinge joint. Also, in such embodiments, a second hinge joint part at a second end of the pivot link is configured to connect to a hinge joint part of the phone mount base. Also, the second hinge joint part of the pivot link, the hinge joint part of the phone mount base, and a base pivot pin are combinable along a second common axis to form a second hinge joint. Also, the first end of the pivot link opposes the second end of the pivot link, in such embodiments.

In some embodiments, the pivot link includes a first hinge joint part at a first end of the pivot link, configured to connect to a hinge joint part of the finger retainer. In such embodiments, the first hinge joint part of the pivot link and the hinge joint part of the finger retainer are combinable to form a first hinge joint. Also, in such embodiments, the pivot link includes a second hinge joint part at a second end of the pivot link, and the second hinge joint part of the pivot link is configured to connect to a hinge joint part of the phone mount base. Also, the second hinge joint part of the pivot link and the hinge joint part of the phone mount base are combinable to form a second hinge joint. Also, the first end of the pivot link opposes the second end of the pivot link, in such embodiments.

While the invention has been described in conjunction with the specific embodiments described herein, it is evident that many alternatives, combinations, modifications and variations are apparent to those skilled in the art. For instance, the materials used can be modified, e.g., the attachment technique can use microsuction tape that is removable without leaving residue. Also, for example, the general shape of the finger retainer 1, pivot link 2, and phone mount base 3 or recessed phone mount base 4 can be modified significantly while still retaining the features unique to the invention described herein. Accordingly, the example embodiments of the invention, as set forth herein are intended to be illustrative only, and not in a limiting sense. Various changes can be made without departing from the spirit and scope of the invention.

What is claimed is:

1. An apparatus, comprising:
    a finger retainer;
    a phone mount base comprising a finger bracing chamfer;
    a pivot link, comprising:
        a first hinge joint part at a first end of the pivot link, configured to connect to a hinge joint part of the finger retainer; and
        a second hinge joint part at a second end of the pivot link, configured to connect to a hinge joint part of the phone mount base, wherein the first end of the pivot link opposes the second end of the pivot link;
    a first hinge joint, comprising, the first hinge joint part of the pivot link and the hinge joint part of the finger retainer; and
    a second hinge joint, comprising, the second hinge joint part of the pivot link and the hinge joint part of the phone mount base,
        wherein the phone mount base is a recessed phone mount base, and wherein a top surface of the recessed phone mount base contacts a bottom surface of the finger retainer when the apparatus is in a compact configuration, wherein the phone mount base comprises:
a first side configured to attach to the second hinge joint part of the pivot link;
a second side, opposing the first side; and
an adhesive component that is part of one surface of two-sided adhesive tape, and wherein the pivot link comprises an elastomer material with a bump snap protrusion that is configured to deform to fixably engage a holding snap feature when the apparatus is in the compact configuration.

2. The apparatus of claim 1,
wherein the second side comprises a plurality of magnets.

3. The apparatus of claim 1, wherein the first hinge joint comprises a finger retainer pivot pin, and wherein the first hinge joint part of the pivot link, the hinge joint part of the finger retainer, and the finger retainer pivot pin are combinable along a common axis to form the first hinge joint.

4. The apparatus of claim 1, wherein the second hinge joint comprises a base pivot pin, and wherein the second hinge joint part of the pivot link, the hinge joint part of the phone mount base, and the base pivot pin are combinable along a common axis to form the second hinge joint.

5. The apparatus of claim 1, wherein the phone mount base comprises a finger retainer recess configured to constrain rotation of the pivot link to provide a hook-like feature of the apparatus.

6. The apparatus of claim 1, wherein the phone mount base comprises a finger retainer recess configured to constrain rotation of the pivot link to provide a hook-like feature of the apparatus.

7. The apparatus of claim 1, wherein the first hinge comprises a first plurality of friction hinge o-rings, wherein the first hinge comprises a first friction hinge counter-bore, wherein the second hinge comprises a second plurality of friction hinge o-rings, and wherein the second hinge comprises a second friction hinge counter-bore.

8. The apparatus of claim 7, wherein the pivot link comprises an elastomeric material and is configured to:
align the finger retainer with the phone mount base; and
operate with the first plurality of friction hinge o-rings and the second plurality of friction hinge o-rings.

9. The apparatus of claim 1, wherein the bump snap protrusion is molded into the pivot link that deforms to engage the holding snap feature of the apparatus as the finger retainer is moved into the compact configuration.

10. The apparatus of claim 1, wherein the finger retainer comprises alpha-numeric strings containing directions and unique ID markings.

11. The apparatus of claim 1, comprising a unique ID marking on a surface of the apparatus, and wherein the unique ID marking comprises a two-dimensional barcode.

12. The apparatus of claim 1, wherein the phone mount base comprises a beveled undercut, configured to support a snap-in attachment and a separate mount that engages the beveled undercut to hold a mobile phone firmly to withstand separation between the apparatus and the separate mount while the mobile phone and the apparatus are accelerated in any direction encountered while being within a moving vehicle.

13. The apparatus of claim 1, wherein the phone mount base comprises:

a first recess to support the finger retainer in a first position that is a first amount of degrees to a back surface of the phone mount base so that the apparatus provides a stand; and
a second recess to support the finger retainer in a second position that is a second amount degrees to the back surface of the phone mount base so that the apparatus provides a hook-like feature.

14. The apparatus of claim 1, wherein the recessed phone mount base comprises a mount base recess that allows the finger retainer to be pushed down so that the apparatus is in the compact configuration where the phone mount base provides a mount base protective edge that surrounds an outer diameter of a portion of the finger retainer and allows at least part of the finger retainer to be recessed into the recessed phone mount base and protected by the mount base protective edge.

15. The apparatus of claim 1, wherein the phone mount base has an annular undercut feature that allows attachment of the phone mount base to a separate annular mount.

16. The apparatus of claim 15, wherein the phone mount base and the annular undercut feature provides an annular disc with a radiused transition into a taper of the phone mount base that allows engagement with an annular mount clip.

17. The apparatus of claim 1, further comprising the finger retainer comprises a recess to receive a removable art disc top.

18. The apparatus of claim 1, wherein the pivot link comprises an elastomeric material.

19. An apparatus, comprising:
a finger retainer;
a phone mount base comprising a finger bracing chamfer; and
a pivot link, comprising:
a first hinge joint part at a first end of the pivot link, configured to connect to a hinge joint part of the finger retainer, wherein the first hinge joint part of the pivot link, the hinge joint part of the finger retainer, and a finger retainer pivot pin are combinable along a first common axis to form a first hinge joint; and
a second hinge joint part at a second end of the pivot link, configured to connect to a hinge joint part of the phone mount base,
wherein the second hinge joint part of the pivot link, the hinge joint part of the phone mount base, and a base pivot pin are combinable along a second common axis to form a second hinge joint,
wherein the first end of the pivot link opposes the second end of the pivot link,
wherein the phone mount base is a recessed phone mount base, and wherein a top surface of the recessed phone mount base contacts a bottom surface of the finger retainer when the apparatus is in a compact configuration,
wherein the phone mount base comprises:
a first side configured to attach to the second hinge joint part of the pivot link;
a second side, opposing the first side; and
an adhesive component that is part of one surface of two-sided adhesive tape, and
wherein the pivot link comprises an elastomer material with a bump snap protrusion that is configured to deform to fixably engage a holding snap feature when the apparatus is in the compact configuration.

20. An apparatus, comprising:
a finger retainer;
a phone mount base comprising a finger bracing chamfer; and
a pivot link, comprising:
- a first hinge joint part at a first end of the pivot link, configured to connect to a hinge joint part of the finger retainer, wherein the first hinge joint part of the pivot link and the hinge joint part of the finger retainer are combinable to form a first hinge joint; and
- a second hinge joint part at a second end of the pivot link, configured to connect to a hinge joint part of the phone mount base,
   - wherein the second hinge joint part of the pivot link and the hinge joint part of the phone mount base are combinable to form a second hinge joint, wherein the first end of the pivot link opposes the second end of the pivot link, wherein the phone mount base is a recessed phone mount base, and wherein a top surface of the recessed phone mount base contacts a bottom surface of the finger retainer when the apparatus is in a compact configuration, wherein the phone mount base comprises:
- a first side configured to attach to the second hinge joint part of the pivot link;
- a second side, opposing the first side; and
   - an adhesive component that is part of one surface of two-sided adhesive tape, and wherein the pivot link comprises an elastomer material with a bump snap protrusion that is configured to deform to fixably engage a holding snap feature when the apparatus is in the compact configuration.

* * * * *